United States Patent
Matsushita et al.

(10) Patent No.: US 6,693,250 B2
(45) Date of Patent: *Feb. 17, 2004

(54) HYBRID GAS INSULATION SWITCHGEAR APPARATUS

(75) Inventors: Kozo Matsushita, Chigasaki (JP); Katsumi Suzuki, Yokohama (JP); Hiroshi Furuta, Yokohama (JP); Kenji Arai, Yokohama (JP); Osamu Nakano, Yokohama (JP); Kazutoshi Ogata, Munakata (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 10/314,213

(22) Filed: Dec. 9, 2002

(65) Prior Publication Data

US 2003/0062340 A1 Apr. 3, 2003

Related U.S. Application Data

(62) Division of application No. 09/919,941, filed on Aug. 2, 2001.

(30) Foreign Application Priority Data

Aug. 2, 2000 (JP) .................................... 2000-234918

(51) Int. Cl.[7] .............................................. H01H 33/14
(52) U.S. Cl. .............................................. 218/3; 218/43
(58) Field of Search .............................. 218/3, 43, 2, 7, 218/70, 68, 71, 67, 79, 123

(56) References Cited

U.S. PATENT DOCUMENTS

| | | | | |
|---|---|---|---|---|
| 4,307,273 A | * | 12/1981 | Sasaki et al. | 218/43 |
| 4,486,633 A | * | 12/1984 | Calvino | 218/43 |
| 5,796,060 A | * | 8/1998 | Fuchsle et al. | 218/79 |

* cited by examiner

Primary Examiner—Karl D. Easthom
Assistant Examiner—M. Fishman
(74) Attorney, Agent, or Firm—Oblon, Spivak, McClelland, Maier & Neustadt, P.C.

(57) ABSTRACT

A hybrid gas insulation switchgear apparatus comprises an enclosure in which an insulating gas is sealed, a bushing unit provided for the enclosure, a breaker unit disposed inside the enclosure, a disconnector unit disposed inside the enclosure and including disconnectors to be connected electrically in series to both sides of the breaker unit, an earth switch unit disposed inside the enclosure and including earth switches disposed between the breaker unit and the disconnectors, respectively, the earth switches being provided with main pole side electrodes disposed on the side of the breaker unit, and a current transformer unit mounted to the enclosure. The bushing unit including bushings each having a conductor connected to an electrode in the disconnector on a side opposite to the breaker.

6 Claims, 21 Drawing Sheets

HYBRID GAS INSULATION SWITCHGEAR APPARATUS

BACKGROUND OF THE INVENTION

The present invention relates to a switchgear apparatus for power supply, more particularly, to a hybrid (–type) gas insulation switchgear apparatus with improvement in arrangement of various constitutional members or units including a breaker.

A substation layout includes, as representative examples, one shown in a single line (connection) diagram of a single bus of FIG. 20, and one shown in a single line (connection) diagram of one and half bus (1½) of FIG. 21. In FIGS. 20 and 21, the switchgear apparatus corresponding to a portion surrounded by short dash-lines have similar structures, respectively, in which a breaker 20 and disconnectors 30 disposed on both ends of the breaker 20 are electrically connected in series. Reference numeral 90 denotes a transformer.

In general, in air substations, since bus and steel tower have long service lives, the bus or steel tower is less exchanged or replaced at a time of exchanging or replacing the switchgear apparatus. In this viewpoint, usually, the switchgear apparatus is replaced by another one having high performance and high reliability, while effectively utilizing an air insulating bus and the like already set in place.

In order to meet such needs, there has so far been proposed a hybrid (–type) gas insulation switchgear apparatus. As an example of hybrid gas insulation switchgear apparatus, a general hybrid gas insulation switchgear apparatus will be explained hereunder with reference to an illustration of FIG. 22. The illustrated hybrid gas insulation switchgear apparatus corresponds to a portion shown with a dash-line portion in the single-line connection diagrams in FIG. 20 and FIG. 21 and is applicable to a double bus type bus connection, though not illustrated.

In other words, the breaker 20 in the hybrid gas insulation switchgear apparatus is operated by an operating mechanism 28 and is equipped with a stationary side electrode 21 and a movable side electrode 22 accommodated in an enclosure 81. The breaker 20 is provided with both side portions to which disconnectors 30a, 30b accommodated in enclosures 82a, 82b are provided. The disconnectors 30a, 30b are constituted to be capable of being opened or closed (switched) by an operating mechanism 33. The enclosures 82a, 82b are supported by a frame. The breaker 20 and the disconnectors 30a, 30b are connected through an adapter conductor 100 accommodated in a vessel.

On the enclosures 82a, 82b accommodating the disconnectors 30a, 30b, there are fitted the bushings 1a, 1b through the insulating spacers 63, respectively, and the conductors 11a, 11b of the inside bushings are connected to the disconnectors 30a, 30b through conductors provided on the insulating spacers 63. Further, an earth switches 4a, 4b are disposed between the adapter conductor 100 and the disconnectors 30a, 30b so as to be opened or closed by an operating mechanism 43. Reference numerals 70a, 70b denote current transformers.

However, in the conventional hybrid gas insulation switchgear apparatus of the structures mentioned above, the breaker 20 and the disconnectors 30a, 30b are accommodated respectively independently in the separate enclosures 81, 82a, and 82b. Accordingly, the entire size of the device is apt to become larger, the weight thereof is also apt to become heavier, and product price becomes higher.

SUMMARY OF THE INVENTION

An object of the present invention is to substantially eliminate defects or drawbacks encountered in the prior art mentioned above and to provide a hybrid (type) gas insulation switchgear apparatus or system having a compact and simple structure, which can be easily maintained.

This and other objects can be achieved according to the present invention by providing a hybrid gas insulation switchgear apparatus comprising:

an enclosure in which an insulating gas is sealed;
a bushing unit provided for the enclosure;
a breaker unit disposed inside the enclosure;
a disconnector unit disposed inside the enclosure and including disconnectors to be connected electrically in series to both sides of the breaker unit;
an earth switch unit disposed inside the enclosure and including earth switches disposed between the breaker unit and the disconnectors, respectively, the earth switches being provided with main pole side electrodes disposed on the side of the breaker unit; and
a current transformer unit mounted to the enclosure,
the bushing unit including bushings each having a conductor connected to an electrode in the disconnector on a side opposite to the breaker.

According to this aspect, the breaker unit, the disconnector unit and the earth switch unit are accommodated in a single enclosure, and therefore, it is not necessary to use a long connecting conductors such as that required in a prior art. Accordingly, it is possible to realize a hybrid gas insulation switchgear apparatus having compact and lightweight size.

Hereunder, preferred embodiments of the present invention and their advantageous functions and effects will be described.

The conductor of the bushing and the electrode of the disconnector are supported and fixed in the enclosure by an insulating member having substantially a cylindrical or columnar shape.

In the above structure, since the conductor of the bushing is directly connected to one side electrode of the disconnector and it is supported in the enclosure by the cylindrical or columnar insulator, it is possible to reduce the number of parts of the connector, thereby making it possible to simplify the assembly working of the apparatus.

A gas space between the enclosure and the bushing unit is sectioned by an insulating member having substantially conical shape, and the electrode disposed on the side opposite to the breaker unit in the disconnector is supported by the insulating member.

According to this arrangement, the workability in the checking or inspecting time can be improved.

The enclosure is provided with at least one branch portion, the bushing unit is mounted to the branch portion and at least a set of disconnector and earth switch is accommodated in the branch portion.

In this structure, since the disconnector and the earth switch are accommodated in the branch portion, the direct exposure of the disconnector and the earth switch to the hot gas blown from the breaker at a time of breaking a large current can be prevented. Accordingly, it is possible to improve safeness. In addition, it is possible to shorten the size of the enclosure for accommodating the breaker.

The enclosure is disposed in a perpendicular direction with respect to a ground surface.

According to this arrangement, the installation area of the switchgear apparatus in the horizontal direction can be widely reduced, and moreover, the insulation distance to the ground of the bushing unit can be secured easily by the perpendicular arrangement of the enclosure.

Two branch portions are provided in different height levels. The direct exposure of the hot gas from the breaker unit at the time of the large current breaking can be prevented by this arrangement.

The two branch portions are provided symmetrically with respect to an axis of the enclosure at mutually different angles.

According to this arrangement, even if the portion accommodating the breaker unit in the enclosure is shortened, the air insulation distance of the bushing unit can be secured, and it is possible to realize the compact structure of the switchgear apparatus.

The breaker unit is driven by an operating mechanism provided on an extension of an axis of the electrode for the breaker unit.

According to this arrangement, it is possible to transmit the driving force of the operating mechanism linearly to the breaker unit, thus simplifying the structure of the driving unit.

The two branch portions are provided in perpendicular direction to the axis of the enclosure. Accordingly, the entire structure of the switchgear apparatus can be made compact and simplified.

Two sets of the earth switches and disconnectors are provided horizontally and in parallel to each other.

According to this structure, since it is possible to save the spaces in the longitudinal direction of the earth switch and the disconnector and shorten the length of the enclosure, the compact structure of the switchgear apparatus can be realized.

The disconnectors are driven by a single operating mechanism. Accordingly, the switchgear apparatus can be also made compact and the control system can be simplified.

A driving force transmitting device for transmitting a driving force of the operating mechanism to the two disconnectors is accommodated in the enclosure. Thus, the gas-tightness to the insulating gas can be easily secured.

The enclosure is disposed in a horizontal direction with respect to the ground level, two branch portions accommodating the disconnectors are provided on an upper portion of the enclosure, an operating mechanism is set at substantially a central portion of the branch portions on the upper portion of the enclosure, and the two disconnectors disposed inside the branch portions and the operating mechanism are connected through an operating rod.

According to this arrangement, since the driving force transmission route can be provided on the straight line, the switchgear apparatus can be simplified in arrangement.

Furthermore, the disconnector unit and the earth switch unit are provided to be driven by a single operating mechanism.

In this arrangement, it is possible to curtail the number of the operating mechanisms, and therefore, it becomes possible to make simplified the entire structure of the switchgear.

The nature and further characteristic features of the present invention will be made more clear from the following descriptions made with reference to the accompanying drawings.

DESCRIPTION OF THE PREFERRED EMBODIMENTS

Figure 19B:
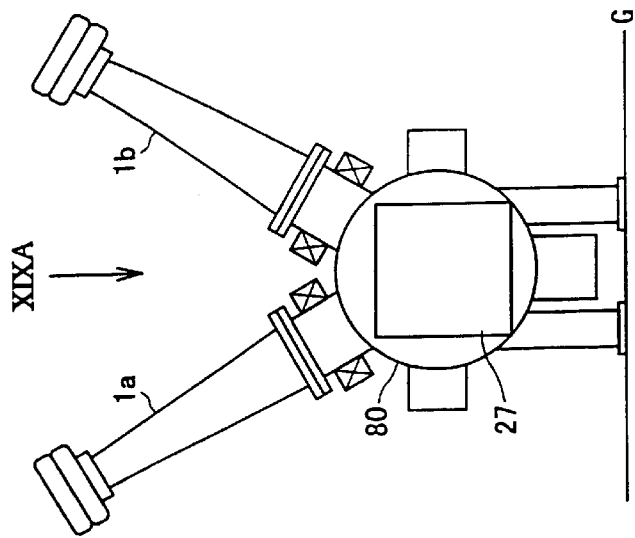
FIG. 19 includes FIG. 19A showing a schematic plan view, partially in section viewed from an arrow XIXA in FIG. 19B, which showing a schematic front view of the hybrid gas insulation switchgear apparatus of FIG. 19A according to a seventeenth embodiment of the present invention.
Figure 19A:
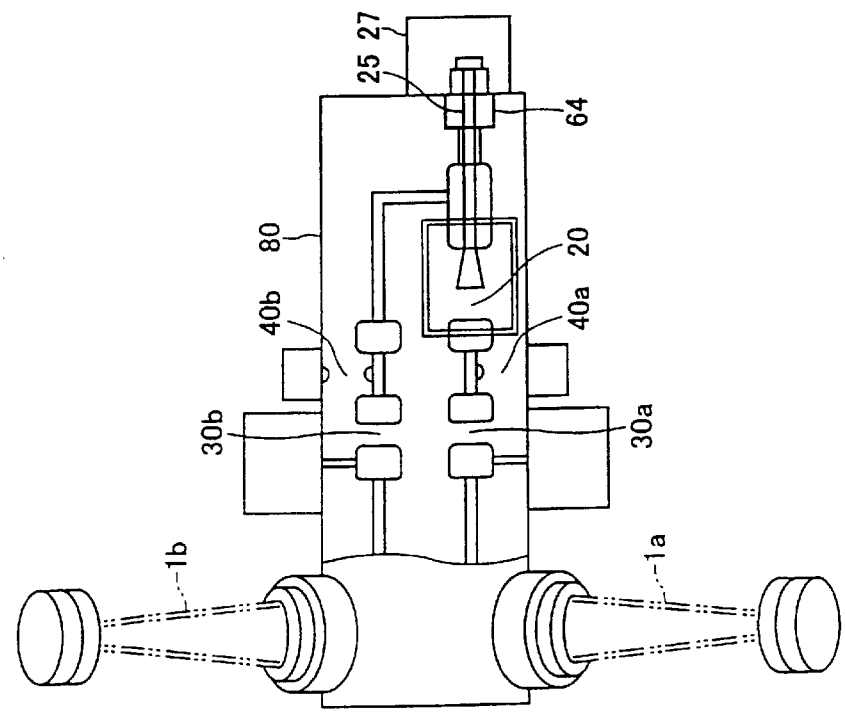
Figure 20:
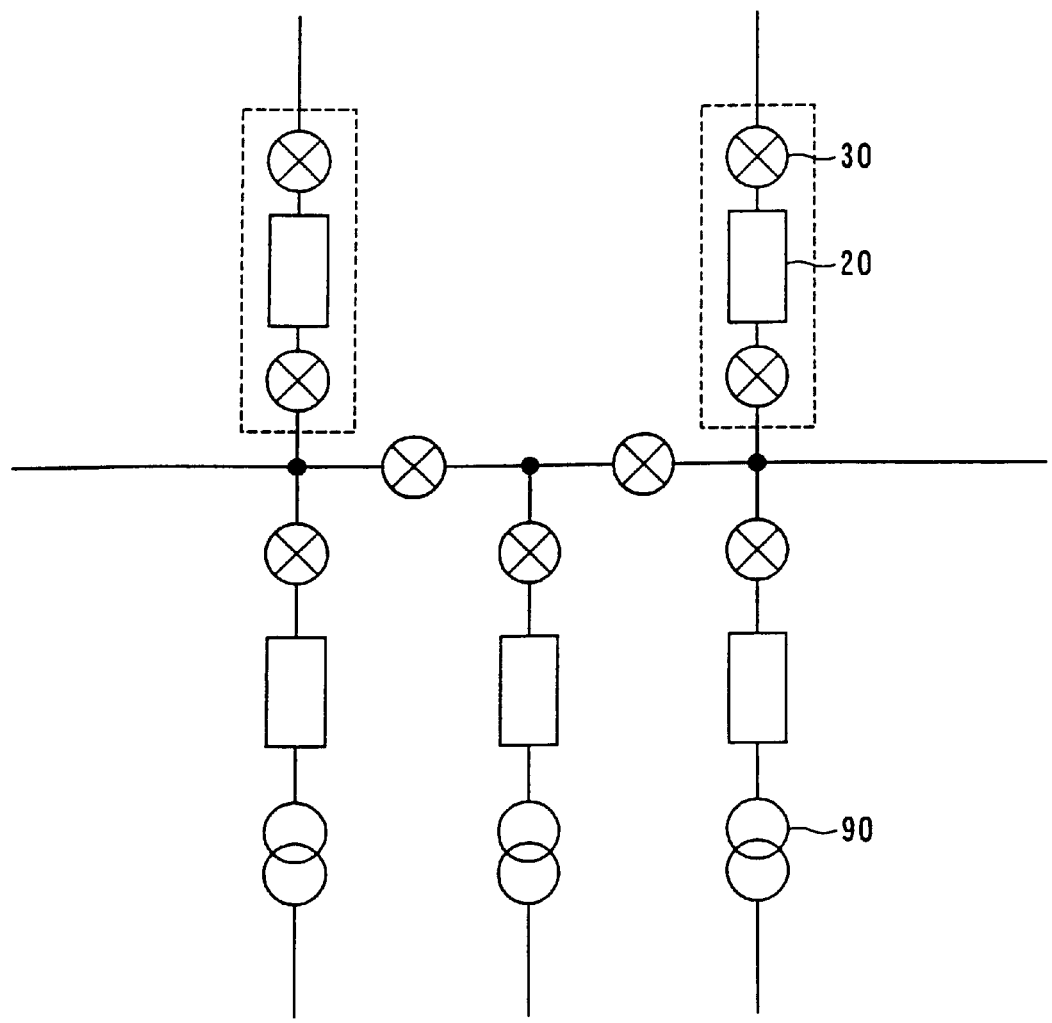
FIG. 20 is a single-line (connection) diagram in a single bus system.
Figure 21:
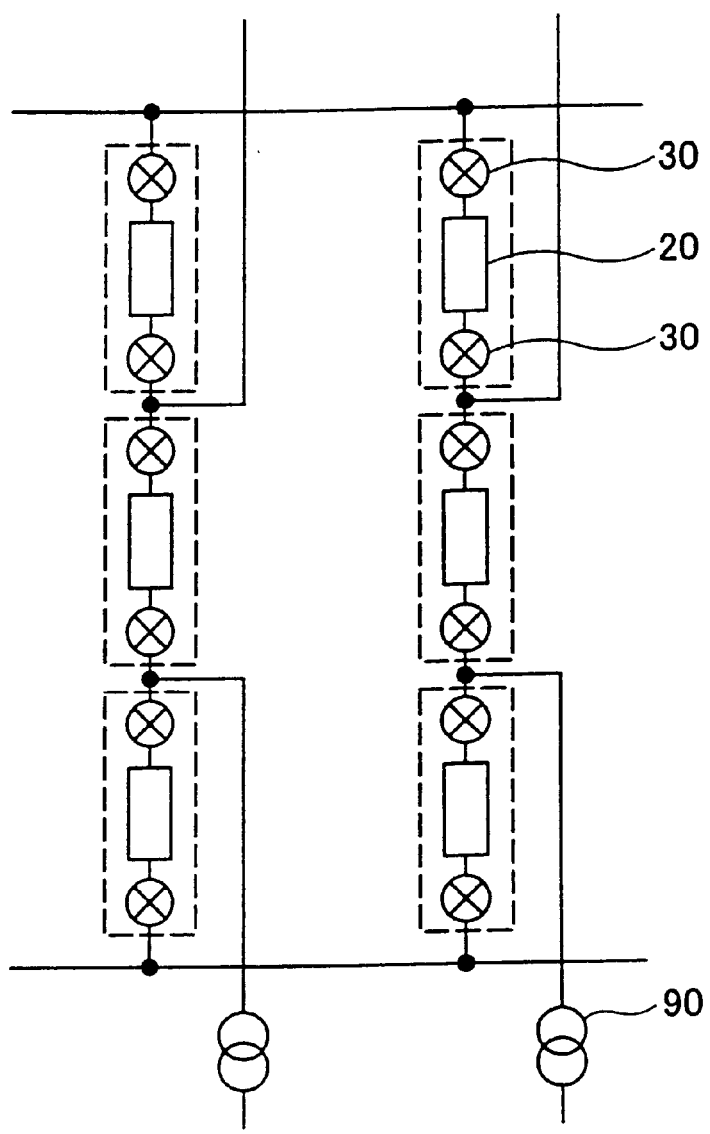
FIG. 21 is a single-line (connection) diagram in one and half (1½) system.
Figure 22:
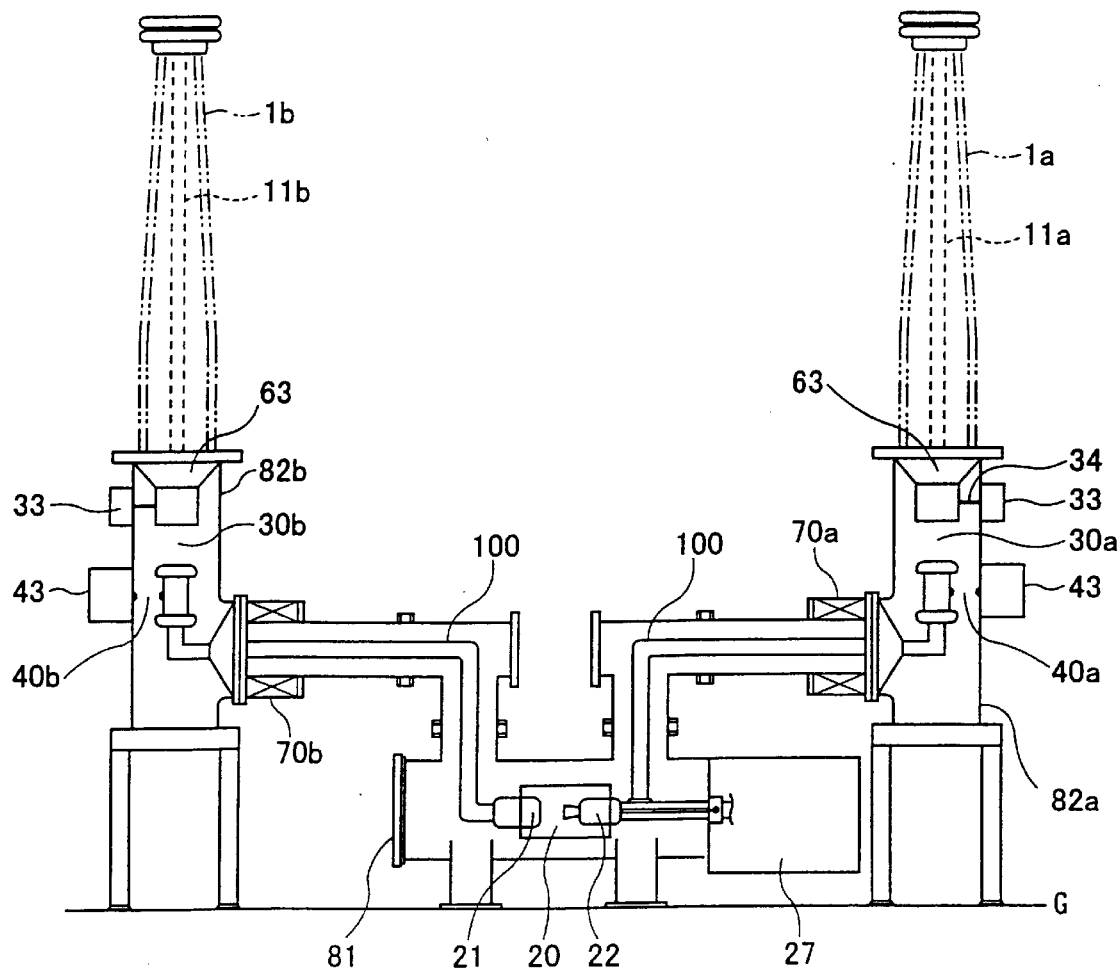
FIG. 22 is a schematic elevational section showing an example of a conventional hybrid gas insulation switchgear apparatus.

Preferred embodiments of hybrid gas insulation switchgear apparatus of the present invention will be described hereunder with reference to FIGS. 1 to 19, in which like reference numerals are added to elements or members corresponding to those shown in FIGS. 20 to 22 showing the conventional example. Further, it is to be noted that the terms such as "upper", "lower", "vertical", "horizontal" and the like are used herein with reference to the illustrated state or to ground level.

1. First Embodiment 1-1. Constitution

Figure 1:
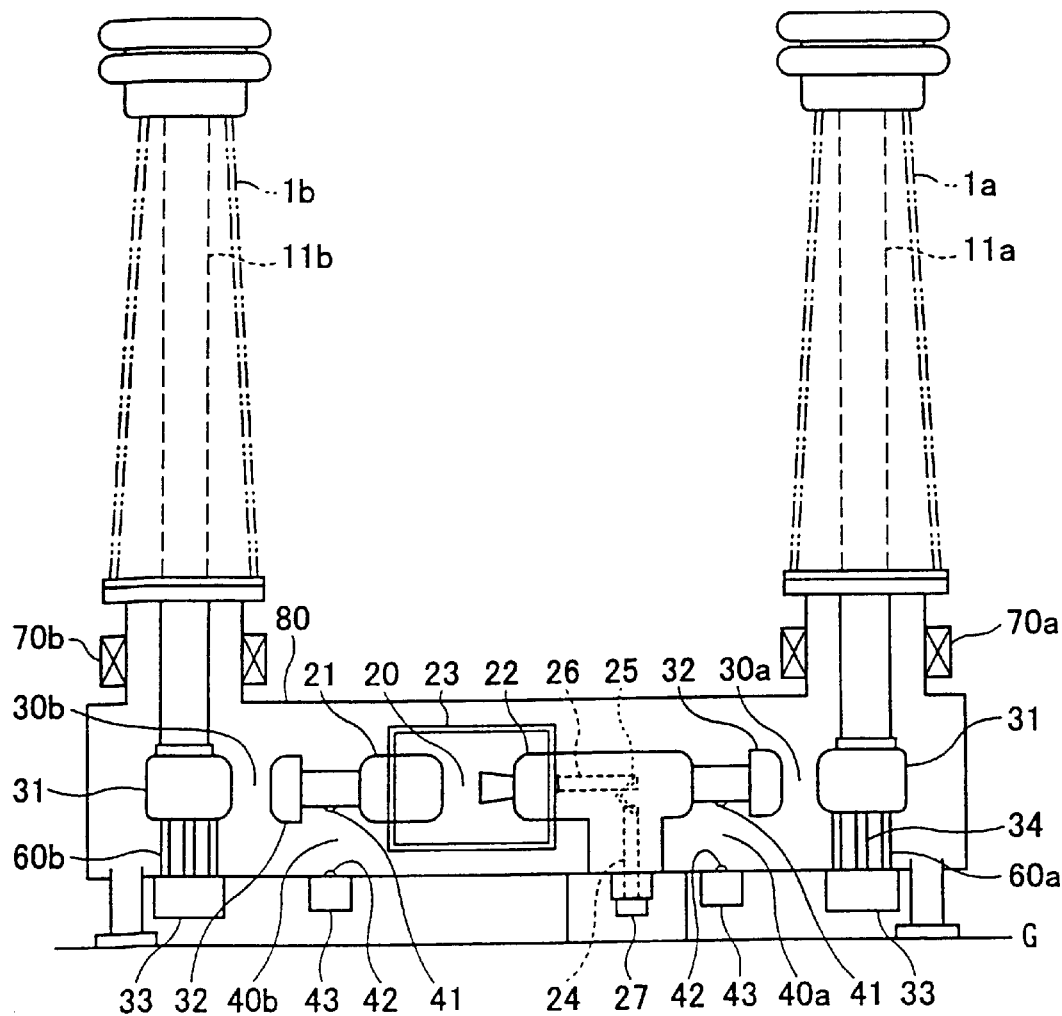
FIG. 1 is a schematic elevational section of a hybrid gas insulation switchgear apparatus according to a first embodiment of the present invention.
Figure 2:
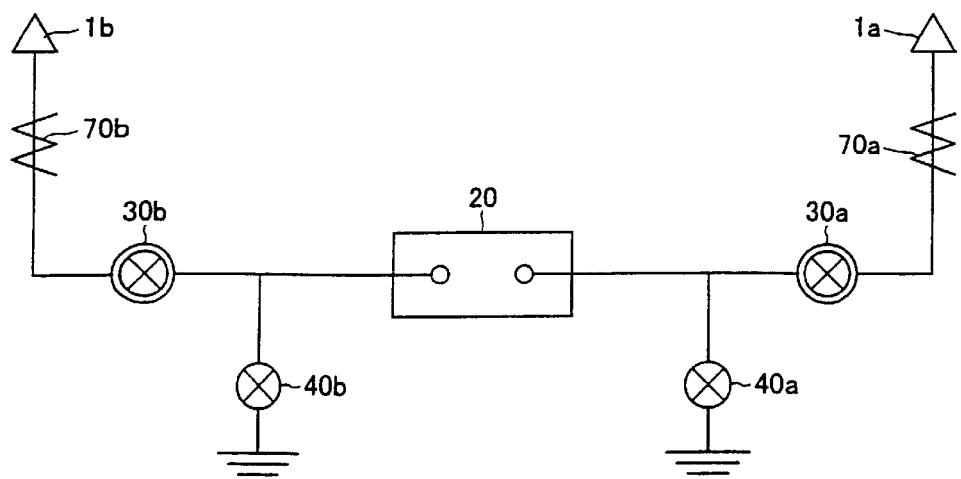
FIG. 2 is a single-line connection diagram (one-line diagram) of FIG. 1.

A first embodiment of the present invention will be first described with reference to FIGS. 1 and 2. A hybrid (−type) gas insulation switchgear apparatus of this first embodiment comprises bushings 1a, 1b and an enclosure 80 in which a breaker 20, disconnectors 30a, 30b and earth switches 40a, 40b are accommodated. Further, current transformers 70a, 70b are provided for the enclosure 80. The breaker 20 is equipped with a stationary side electrode 21 and a movable side electrode 22. The movable side electrode 22 is constructed to be driven by an operating mechanism 27 mounted on the enclosure 80 through an operation rod 24, a conversion lever 25 and a movable side rod 26. Further, the breaker 20 is supported and fixed in the enclosure 80 by a supporting insulator 23.

The disconnectors 30a, 30b are connected in series to both sides of the breaker 20 and equipped with movable side electrodes 31 and stationary side electrodes 32. The movable side electrodes 31 are constituted to be driven through the operating rods 34 by operating mechanisms 33 mounted to the enclosure 80, and the movable side electrodes 31 are supported by cylindrical insulators 60a, 60b mounted to the enclosure 80. Further, to the stationary side electrodes 32, there are provided main pole side electrodes 41 of the earth switches 40a, 40b, respectively. This main pole side electrode 41 is connected to the breaker 20. The movable side electrodes 42 of the earth switches 40a, 40b are constructed to be driven by operating mechanisms 43 mounted on the enclosure 80.

In addition, branch portions are provided on the right and left sides of the upper portion (in the illustration of FIG. 1) of the enclosure 80, and insulators (insulation tubes) of the bushings 1a, 1b are fixed to the ends of the branch portions, respectively. The bushings 1a, 1b are provided with conductors 11a, 11b connected to the movable side electrodes 31 of the disconnectors 30a, 30b, respectively. The current transformers 70a, 70b for identifying an accident are mounted to the branch portions of the enclosure 80.

1-2. Function and Effect

According to this first embodiment of the structures mentioned above, since the breaker 20, the disconnectors 30a, 30b, and the earth switches 40a, 40b are accommodated in the single enclosure 80, the switchgear apparatus as a whole can be formed into a compact size.

In addition, since the kinds and number of the enclosures can be reduced, it becomes unnecessary to use additional buses for connecting devices or units to each other as in the conventional structure. Thus, it is possible to make the apparatus lightweight and low priced and to make simple the entire structure of the switchgear apparatus. Especially, in this embodiment, since the disconnectors 30a, 30b are arranged on both sides of the breaker 20, the structure of this embodiment may be effectively applicable to the single bus, one and half (1 -½) CB system in the substation constitution for which the hybrid type gas insulation, switchgear apparatus is used.

Furthermore, since the conductors 11a, 11b of the bushings 1a, 1b and the movable side electrodes 31 of the disconnectors 30a, 30b are supported and fixed in the insulated manner by the cylindrical insulators 60a, 60b mounted to the enclosure 80, it is possible to omit conductors of insulating spaces sectioning the enclosure 80 from the bushings 1a, 1b to thereby make it possible to directly connect the conductors 11a, 11b of the bushings 1a, 1b to the electrodes of the disconnectors 30a, 30b. Accordingly, it is possible to reduce the number of parts of the connecting members and simplify the constitution and assembly steps or processes.

2. Second Embodiment 2-1. Constitution

Figure 3:
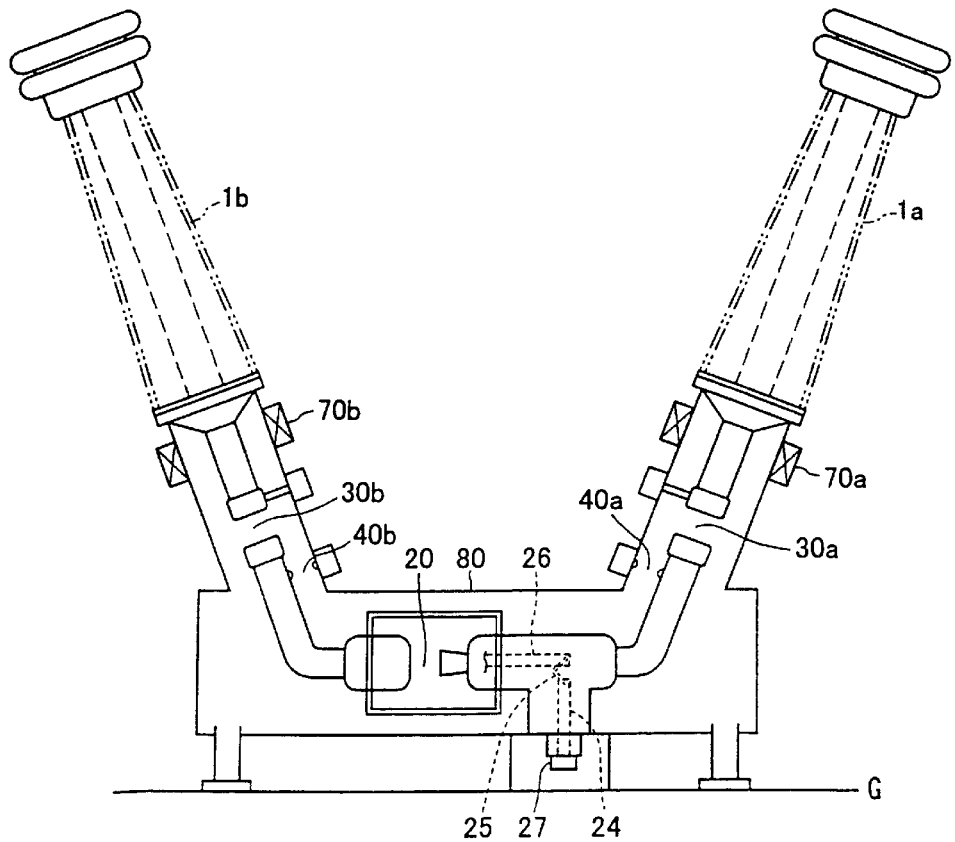
FIG. 3 is a schematic elevational section of a hybrid gas insulation switchgear apparatus according to a second embodiment of the present invention.

A second embodiment of the present invention will be described hereunder with reference to FIG. 3. This second embodiment has a structure basically identical to that of the first embodiment with an exception that, in this second embodiment, two sets of disconnectors 30a, 30b connected in series on both sides of the breaker 20 and earth switches 40a, 40b are accommodated respectively in two branch portions provided on an upper portion of the enclosure 80.

2-2. Function and Effect

According to this second embodiment, since the disconnectors 30a, 30b and the earth switches 40a, 40b are accommodated respectively in the branch portions, the disconnectors 30a, 30b and the earth switches 40a, 40b can be prevented from being directly exposed to a hot gas blown from the breaker 20, thus improving safe operation and workings. Furthermore, a main barrel portion of the enclosure 80 for accommodating the breaker 20 can be made short in length, so that the hybrid gas insulation switchgear apparatus can be made small in size and manufactured with a reduced cost.

3. Third Embodiment 3-1. Constitution

Figure 4:
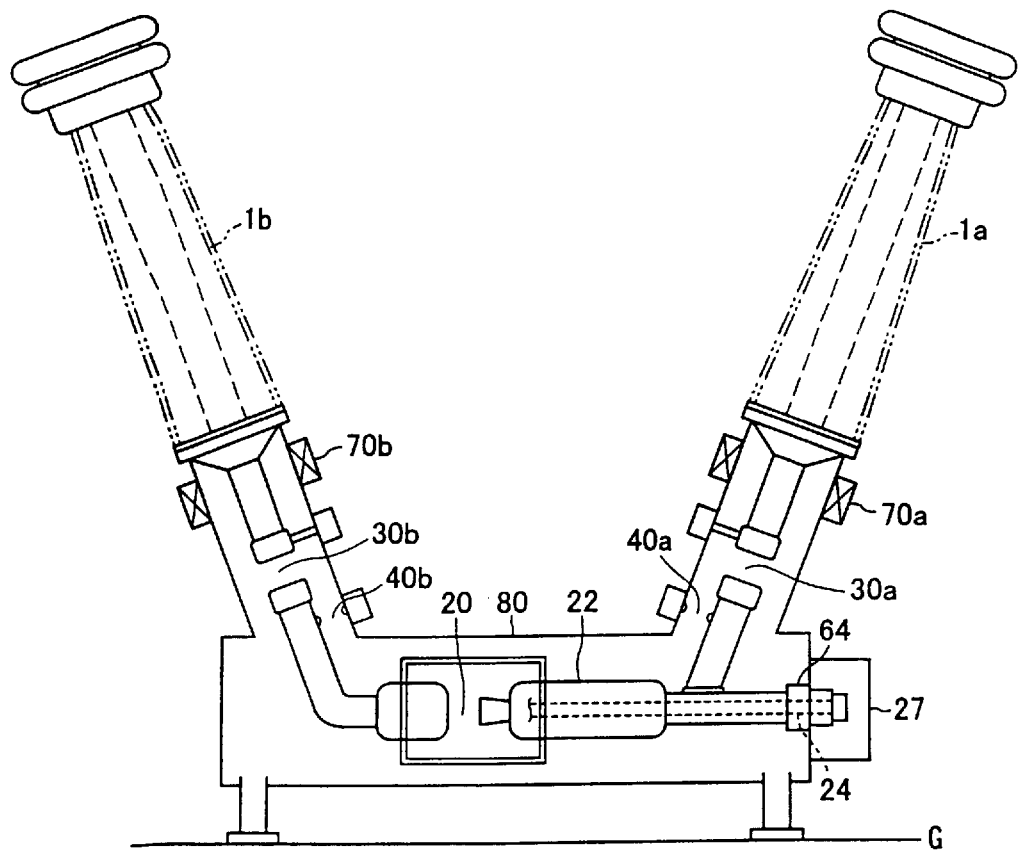
FIG. 4 is a schematic elevational section of a hybrid gas insulation switchgear apparatus according to a third embodiment of the present invention.

A third embodiment of the present invention will be described hereunder with reference to FIG. 4. This third embodiment has a structure basically identical to that of the second embodiment. In this third embodiment, however, an operating mechanism 27 for driving a movable side electrode 22 of the breaker 20 is arranged on one side in the longitudinal direction of the enclosure 80, and an operating rod 24 is arranged on a horizontal line. In addition, a cylindrical insulator 64 for supporting the breaker 20, the earth switch 40a and the stationary side electrode 32 of the disconnector 30a is arranged on the inside surface of the enclosure 80.

3-2. Function and Effect

According to this third embodiment, functions and effects similar to those of the second embodiment are obtainable, and it is possible to arrange the operating rod 24 for driving the breaker 20 on a straight line and to thereby omit the members for converting the driving direction. Accordingly, the structure of the driving unit can be largely simplified.

4. Fourth Embodiment 4-1. Constitution

Figure 5B:
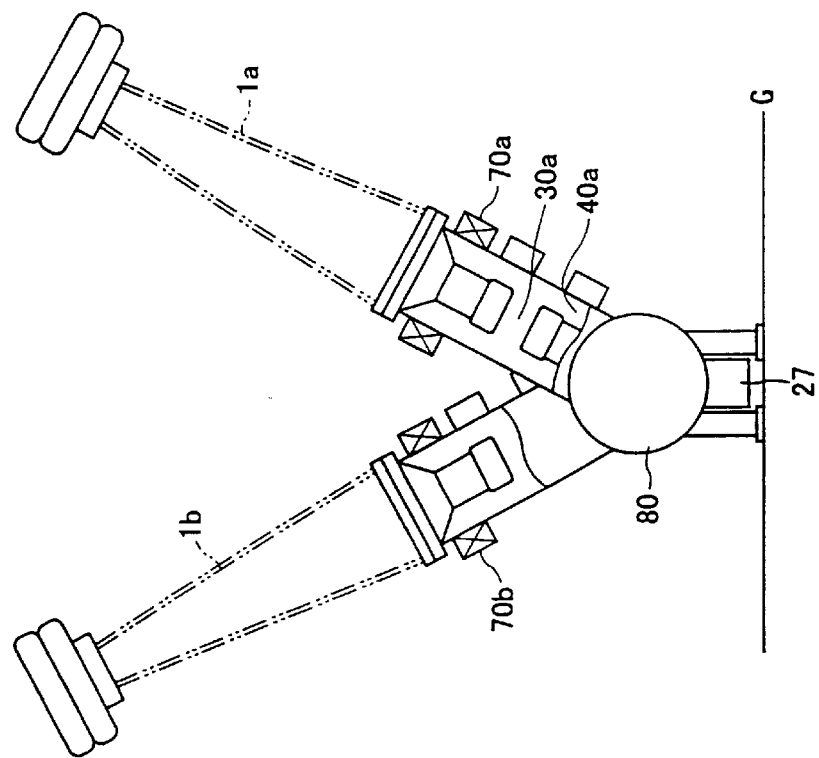
FIG. 5 includes FIG. 5A being a side view and FIG. 5B being a front view of the hybrid gas insulation switchgear apparatus of a fourth embodiment of the present invention.
Figure 5A:
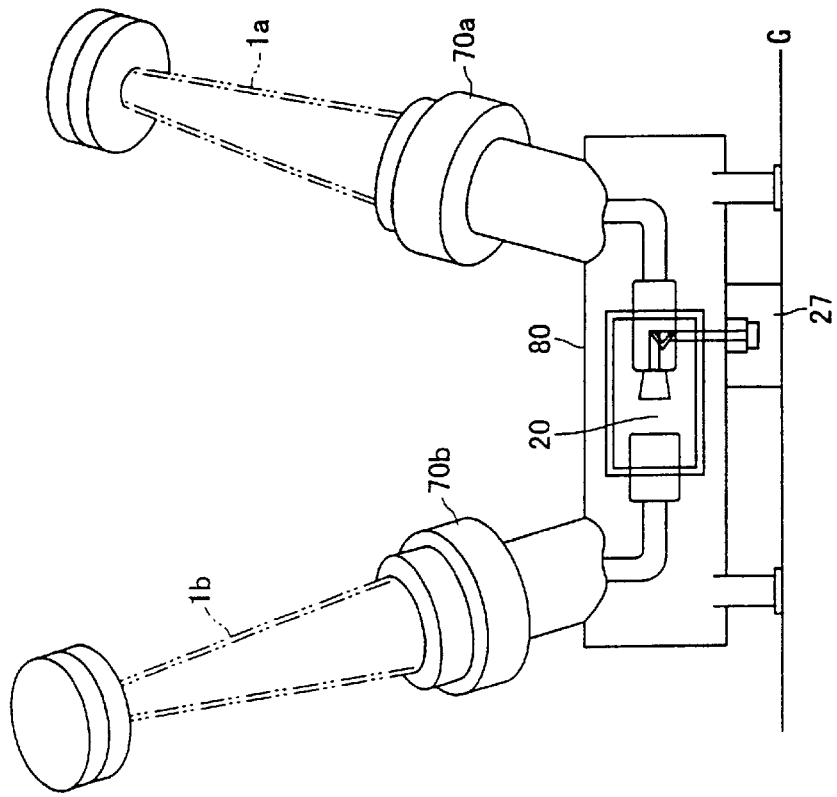

A fourth embodiment of the present invention will be described hereunder with reference to FIGS. 5A and 5B. This fourth embodiment has a structure basically identical to that of the second embodiment with an exception that, as shown in FIG. 5B, the branched portions of the enclosure 80 are arranged, at angles different from each other, axially symmetrically to the enclosure 80 in a manner that the front ends of the bushings 1a, 1b are directed to the mutually separating directions.

4-2. Function and Effect

According to this fourth embodiment, functions and effects similar to those of the second embodiment will be obtainable, and since the branched portions are provided in the mutually separating directions, the air insulating distance between the bushings 1a and 1b can be secured even when the main barrel portion of the enclosure 80 is constructed to be short. Therefore, it is possible to provide a hybrid gas insulation switchgear apparatus having small and compact size, more light weight at a low manufacturing cost while maintaining the safeness of the apparatus.

5. Fifth Embodiment 5-1. Constitution

Figure 6B:
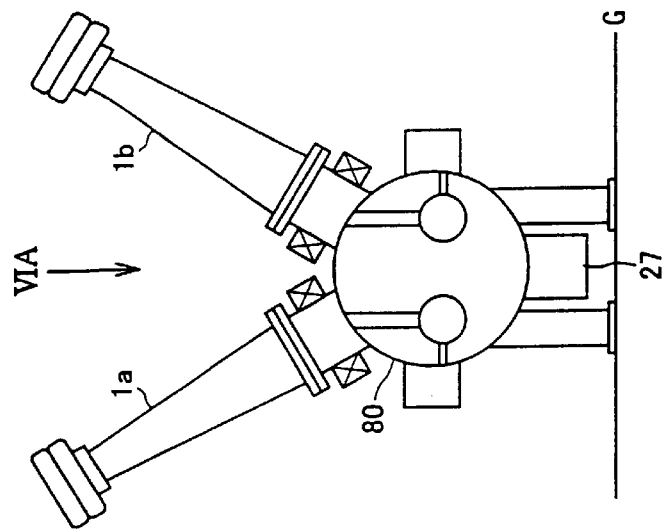
FIG. 6 includes FIG. 6A being a plan view viewed from an arrow VIA in FIG. 6B, which is a sectional view taken along the line VIB—VIB in FIG. 6A of the hybrid gas insulation switchgear apparatus according to a fifth embodiment of the present invention.
Figure 6A:
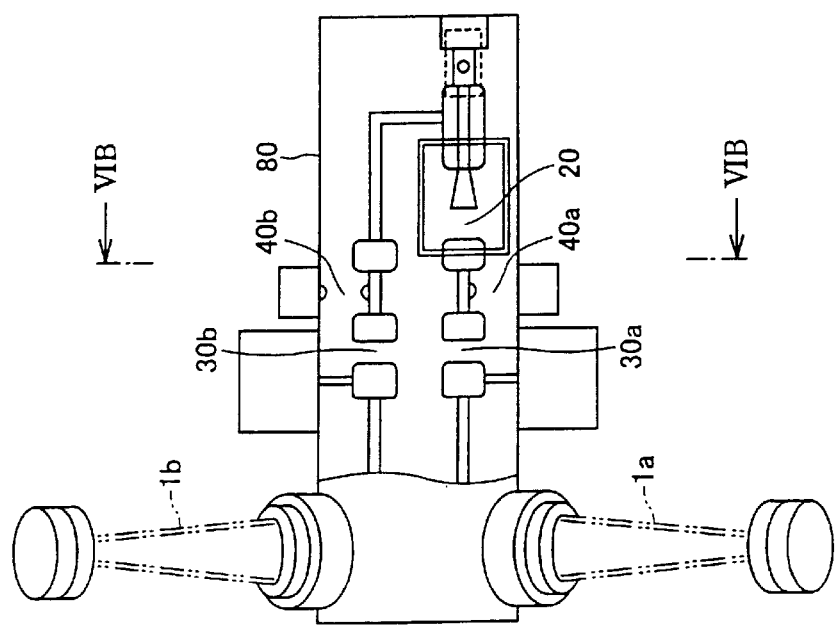

A fifth embodiment of the present invention will be described hereunder with reference to FIGS. 6A and 6B, in which FIG. 6A is a view from an arrow VIA in FIG. 6B and FIG. 6B is a sectional view taken along the line VIB—VIB in FIG. 6A. In this fifth embodiment, although the breaker 20 and the two sets of disconnectors 30 in the first embodiment are not arranged on the same straight line, the disconnectors 30a, 30b and the earth switches 40a, 40b are arranged to be parallel to each other. The conductor connected to the movable side electrode 22 of the breaker 20 extends so as to be turned back and are connected to the stationary side electrode 32 of the disconnector 30b. Furthermore, two branch portions are formed at side end portions in the longitudinal direction of the upper portion of the enclosure 80, and the bushings 1a, 1b are mounted to the branch portions, respectively.

5-2. Function and Effect

According to this fifth embodiment, functions and effects similar to those of the first embodiment will be obtainable. Moreover, since the space in the longitudinal direction of the disconnectors 30a, 30b can be saved and the length of the main barrel portion of the enclosure 80 can be shortened, it becomes possible to make compact and simple whole the switchgear apparatus.

6. Sixth Embodiment 6-1. Constitution

Figure 7:
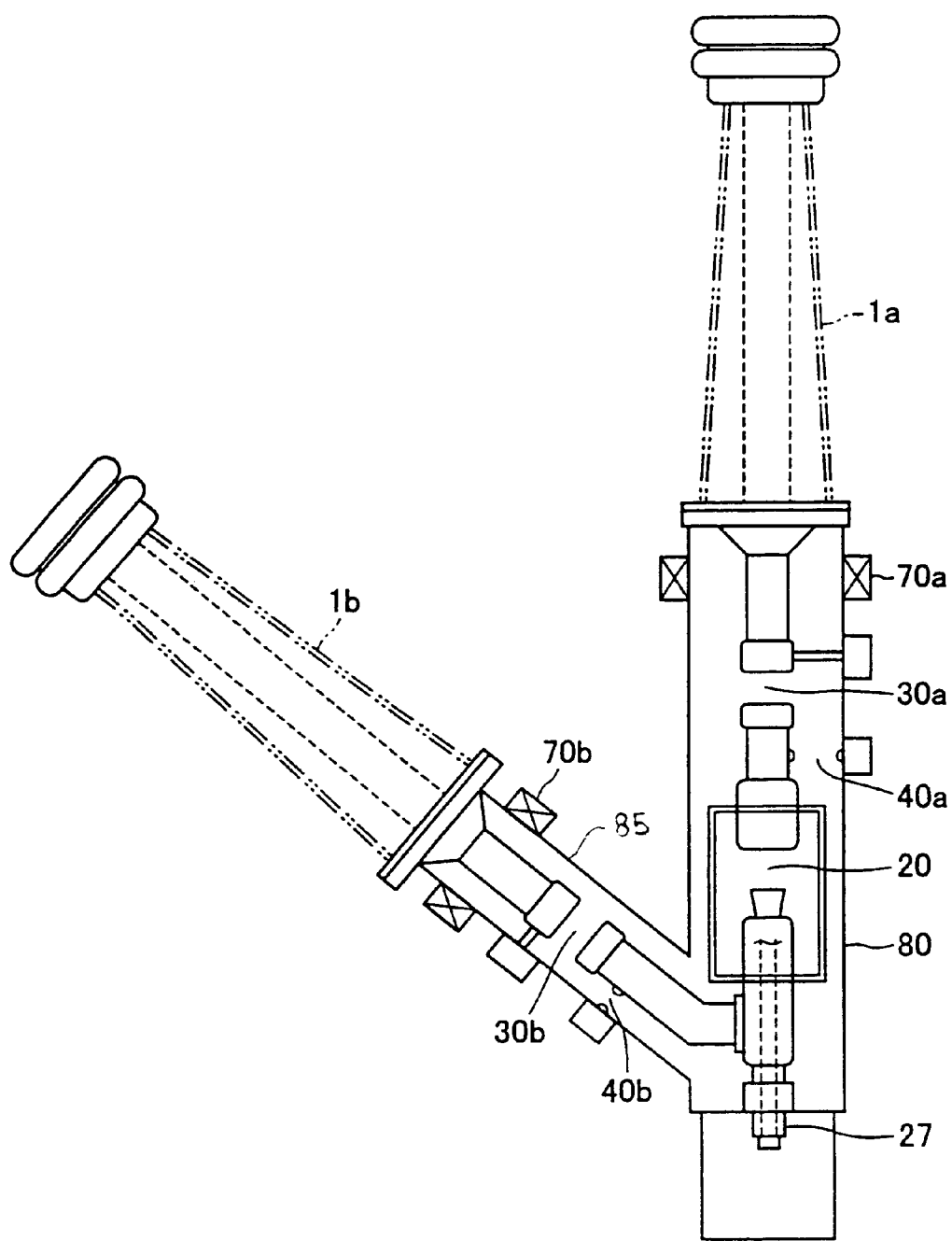
FIG. 7 is a schematic elevational section of the hybrid gas insulation switchgear apparatus according to a sixth embodiment of the present invention.

A sixth embodiment of the present invention will be described hereunder with reference to FIG. 7. It is to be noted that this sixth embodiment is basically similar to the first embodiment in the point that two sets of disconnectors 30a, 30b and earth switches 40a, 40b are respectively connected in series on both sides of the breaker 20. However, in this sixth embodiment, the enclosure 80, in which the breaker 20, the disconnector 30a and the earth switch 40a are accommodated, is disposed in a perpendicular direction with respect to the ground level G.

On the lateral surface of the enclosure 80 mentioned above, there is provided a branch portion oriented obliquely upward. In the branch portion, the disconnector 30b and the earth switch 40b are accommodated. Further, at the end of the enclosure 80, the bushing 1a and the current transformer 70a are mounted, and at the other branched end portion of the enclosure 80, another bushing 1b and current transformer 70b are also mounted.

6-2. Function and Effect

According to this sixth embodiment, function and effects similar to those of the first embodiment will be obtainable, and moreover, the conductor structure can be simplified, while the entire structure of the switchgear apparatus being made largely compact. Accordingly, it becomes possible to make compact and simple the whole apparatus at low manufacturing cost. In addition, it becomes possible to easily ensure the distance of insulation to the earth of the bushings 1a, 1b, thus improving safeness.

7. Seventh Embodiment 7-1. Constitution

Figure 8:
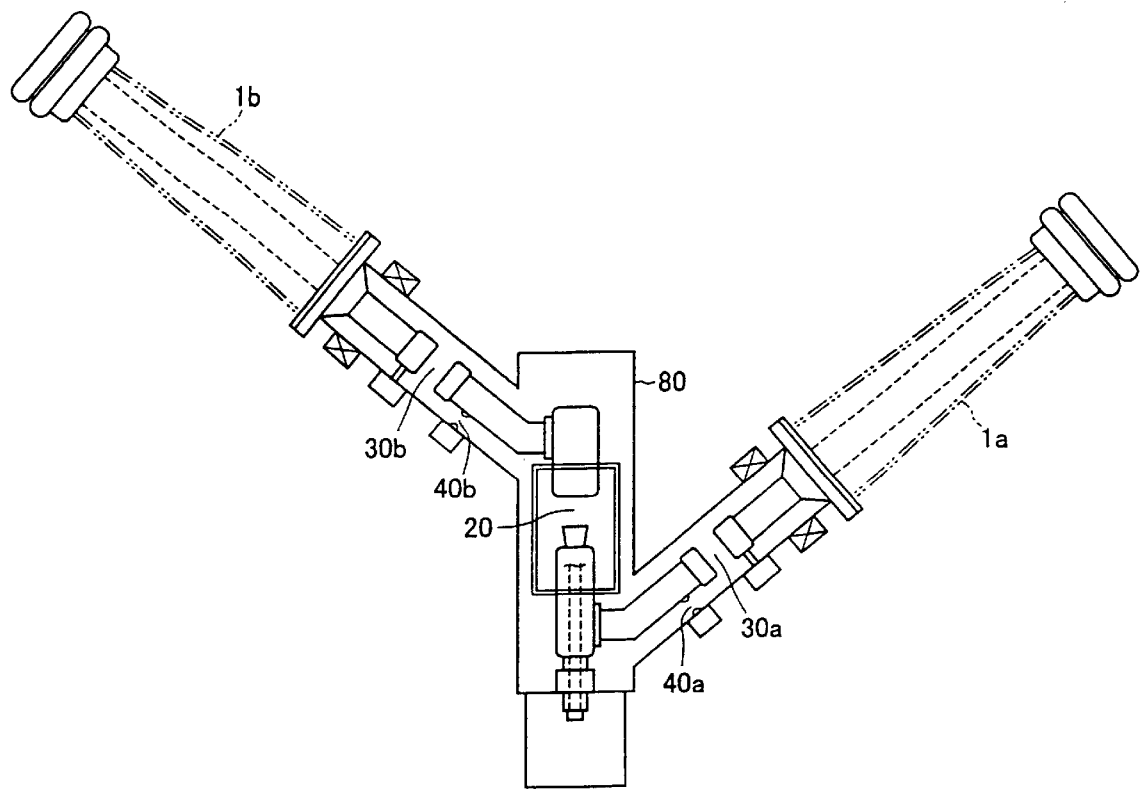
FIG. 8 is a schematic elevational section of the hybrid gas insulation switchgear apparatus according to a seventh embodiment of the present invention.

A seventh embodiment of the present invention will be described hereunder with reference to FIG. 8. This seventh embodiment basically has a structure similar to that of the sixth embodiment. In this seventh embodiment, however, two branch portions having different heights are provided in mutually separating directions on the side surfaces of enclosures 80 accommodating the breakers 20. In these branch portions, there are accommodated the disconnectors 30a, 30b and the earth switches 4a, 4b, respectively.

7-2. Function and Effect

According to this seventh embodiment, functions and effects similar to those of the sixth embodiment will be obtainable, and, due to the provision of differences in the height of the two branch portions, the disconnectors 30a, 30b and the earth switches 40a, 40b are not directly exposed to the hot gas blown from the breaker 20 at the breakage of the large current.

8. Eighth Embodiment 8-1. Constitution

Figure 9:
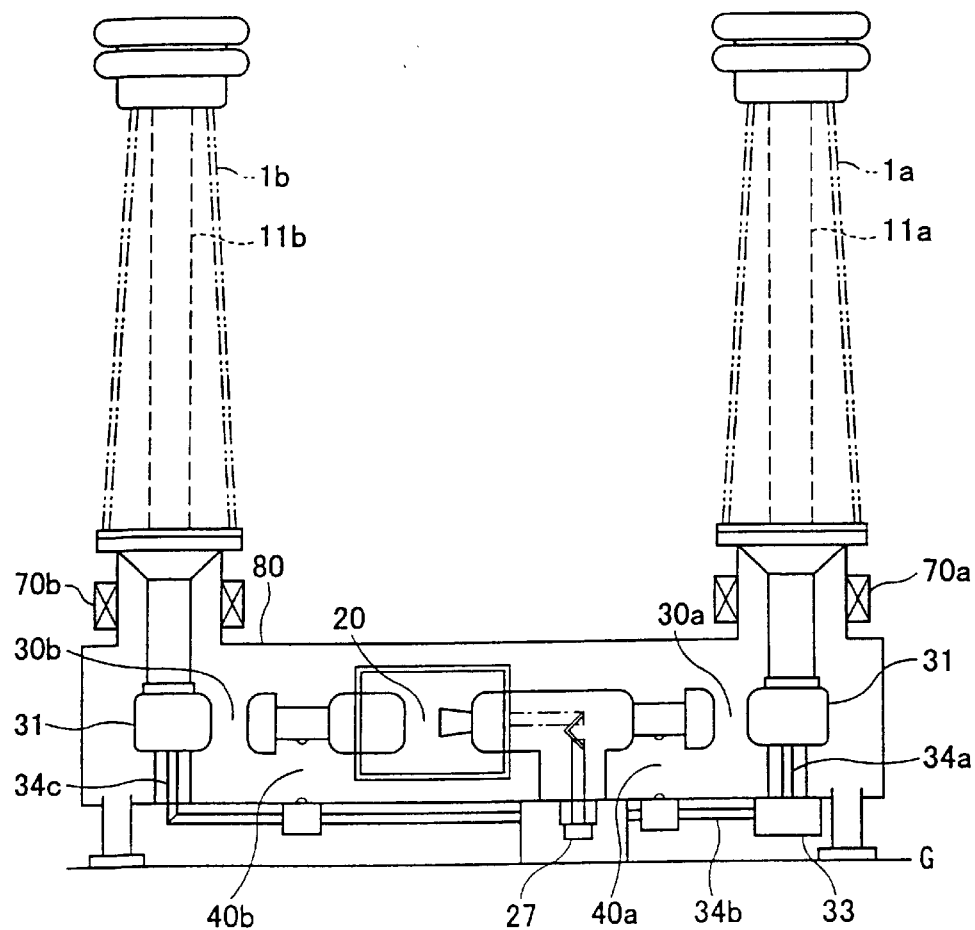
FIG. 9 is a schematic elevational section of the hybrid gas insulation switchgear apparatus according to a eighth embodiment of the present invention.

An eighth embodiment of the present invention will be described with reference to FIG. 9. This eighth embodiment has a structure basically similar to that of the first embodiment. However, in order to allow disconnectors 30a, 30b to be driven by a single operating mechanism 33, one of the operating rods 34a of the operating mechanisms 33 is connected to the movable side electrode 31 of the disconnector 30a and the other one of the operating rods 34b of the operating mechanism 33 is connected to the movable side electrode 31 of the disconnector 30b through the driving direction converter and the operating rod 34c. The operating rod 34b is disposed in the horizontal direction on the lower portion of the enclosure 80.

8-2. Function and Effect

According to this eighth embodiment, one of two operating mechanisms, which had been required in the prior art, can be eliminated, so that the switchgear apparatus can be simplified. Furthermore, since it is possible to curtail the number of the auxiliary contacts and the terminal tables to be transferred to the control board, a control system for the switchgear apparatus can be simplified, and it becomes possible to simplify the sequence in which mutual relation of the machinery can be grasped because the operations of the electric apparatus are represented according to its sequential order.

Furthermore, the disconnectors 30a, 30b at both ends of the breaker 20 are to be operated under the conditions that the breaker 20 has already been opened, and even if the two disconnectors 30a, 30b at both ends of the breaker 20 are independently operated, there is no change in the cable run, so that there causes no problem even if the two disconnectors are simultaneously driven by the same operating mechanism.

9. Ninth Embodiment 9-1. Constitution

Figure 10:
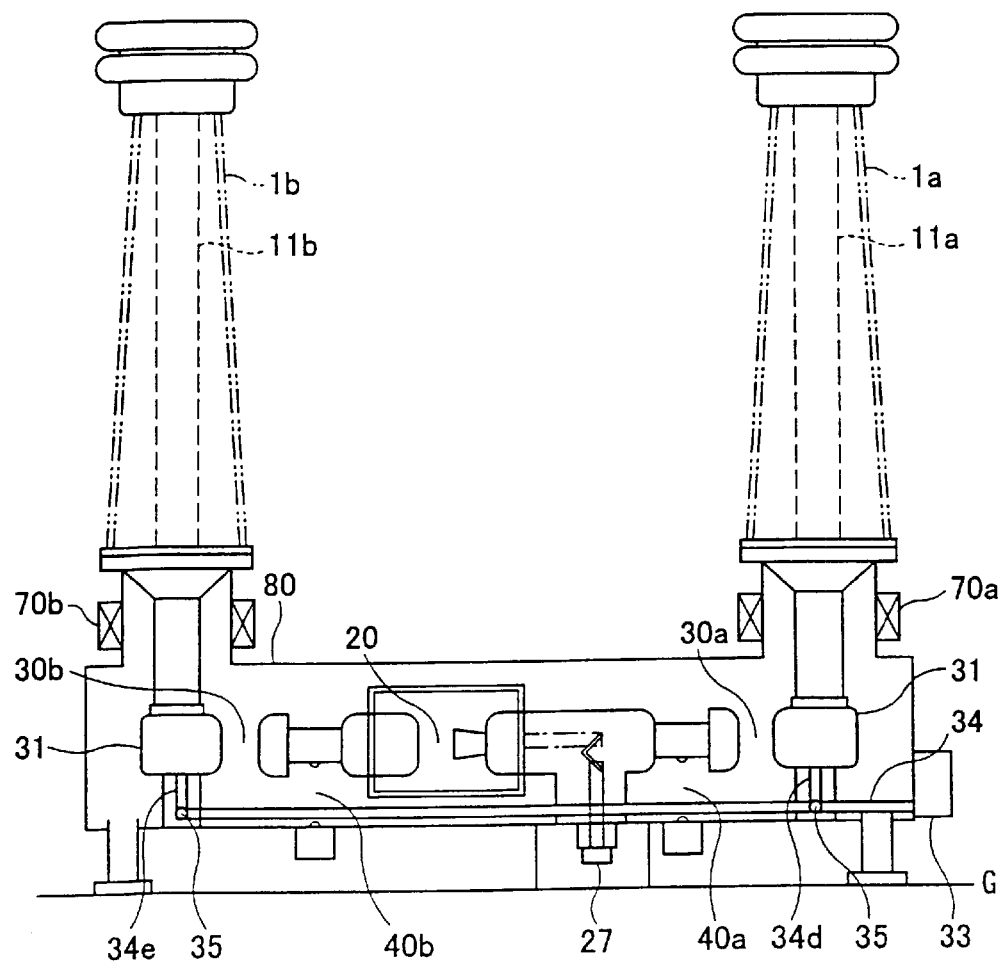
FIG. 10 is a schematic elevational section of the hybrid gas insulation switchgear apparatus according to a ninth embodiment of the present invention.

A ninth embodiment of the present invention will be described hereunder with reference to FIG. 10. This ninth embodiment has a structure basically similar to that of the first embodiment. However, in this ninth embodiment, one operating mechanism 33 is provided on one end side of the enclosure 80 in the longitudinal direction, and a driving force transmitting device is disposed in the enclosure 80 so as to allow disconnectors 30a, 30b to be driven by the operating mechanism 33. This driving force transmitting device comprises an operation rod 34 disposed in parallel to the axis of the enclosure 80 and transmitting sections 34d, 34e for transmitting the driving force of the operation rods 34 to the disconnectors 30a, 30b through driving force branching devices 35.

9-2. Function and Effect

According to this ninth embodiment, functions and effects similar to those of the eighth embodiment will be obtainable, and since the operating rod 34 inside the enclosure 80 is driven by the operating mechanism 33 in air and the two disconnectors 30a, 30b are driven by branching the driving force inside the enclosure 80, it is possible to curtail the place at which air-tightness preservation of the insulating gas is required and to easily maintain the air-tightness.

10. Tenth Embodiment 10-1. Constitution

Figure 11:
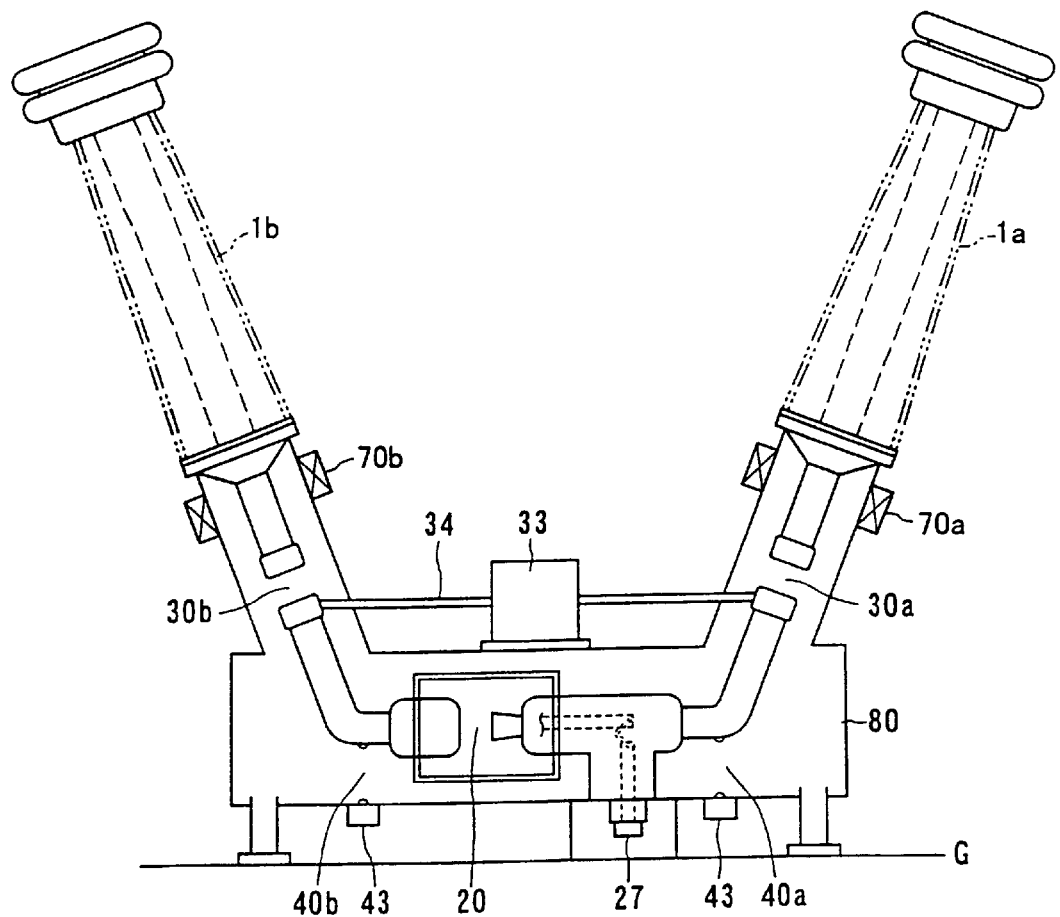
FIG. 11 is a schematic elevational section of the hybrid gas insulation switchgear apparatus according to a tenth embodiment of the present invention.

A tenth embodiment of the present invention will be described hereunder with reference to FIG. 11. This tenth embodiment has a structure basically similar to that of the second embodiment. However, in this tenth embodiment, an operating mechanism 33 is provided at approximately the central portion of the two branch portions on the upper portion of the enclosure 80, and the movable side electrode 31 of disconnectors 30a, 30b is connected to the operating mechanism 33 through an operating rod 34 so as to allow the disconnectors 30a, 30b to be driven by the operating mechanism 33. Further, earth switches 40a, 40b are provided in the enclosure 80.

10-2. Function and Effect

According to this tenth embodiment, functions and effects similar to those of the eighth embodiment will be obtainable, and since the operating mechanism 33 is provided at the central portion of the two branch portions, it becomes unnecessary to use gearwheels or the like for converting the driving force on the transmission axis, and hence, the switchgear apparatus can be simplified in the eitire structure.

11. Eleventh Embodiment 11-1. Constitution

Figure 12B:
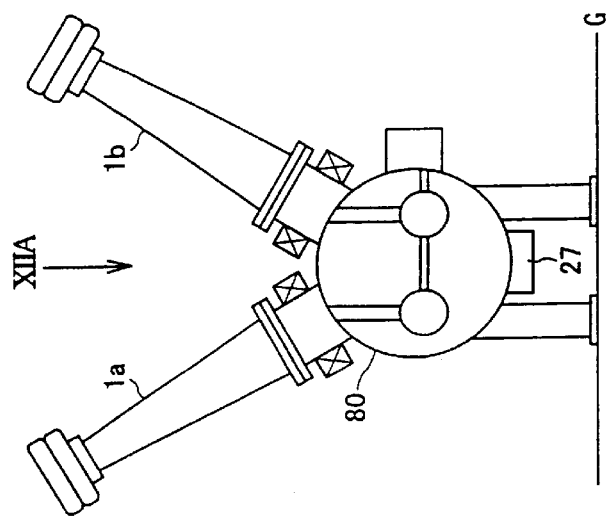
FIG. 12 includes FIG. 12A being a plan view viewed from an arrow XIIA in FIG. 12B, which is a sectional view taken along the line XIIB—XIIB in FIG. 12A of the hybrid gas insulation switchgear apparatus according to an eleventh embodiment of the present invention.
Figure 12A:
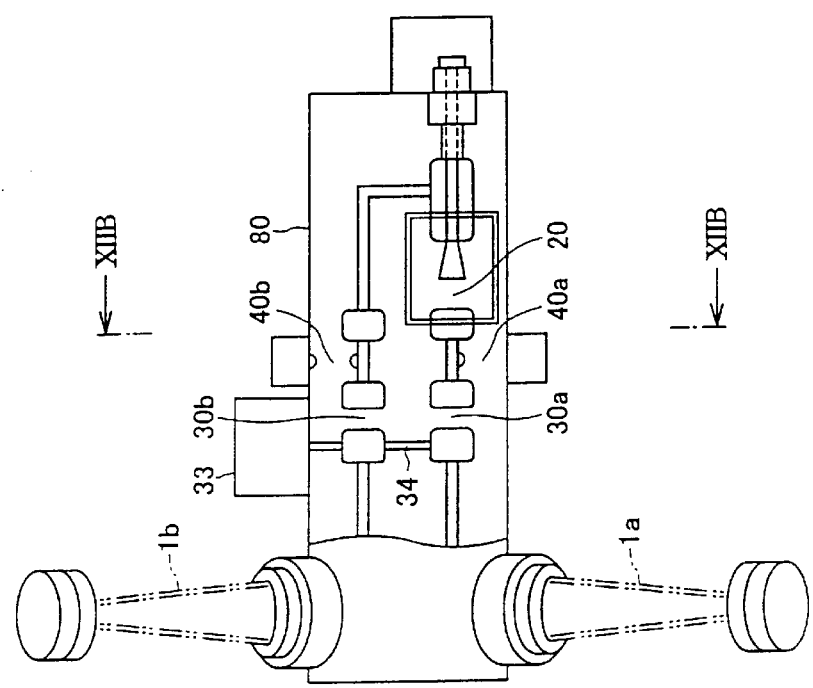

An eleventh embodiment of the present invention will be described hereunder with reference to FIG. 12 (FIGS. 12A and 12B). This eleventh embodiment has a structure basically similar to that of the fifth embodiment. However, in this embodiment, one operating mechanism 33 is arranged on one side surface of the enclosure 80, and the movable side electrode 31 of disconnectors 30a, 30b is connected to the operating mechanism 33 through the operating rod 34 so that the two disconnectors 30a, 30b can be driven by the operating mechanism 33.

11-2. Function and Effect

According to this eleventh embodiment, functions and effects similar to those of the fifth and eighth embodiments will be obtainable, and since the two disconnectors 30a, 30b are arranged in parallel to each other at relatively near portions, a collective driving inside the enclosure 80 by means of the operating mechanism 33 can be facilitated, thus making the structure more simplified.

12. Twelfth Embodiment 12-1. Constitution

Figure 13:
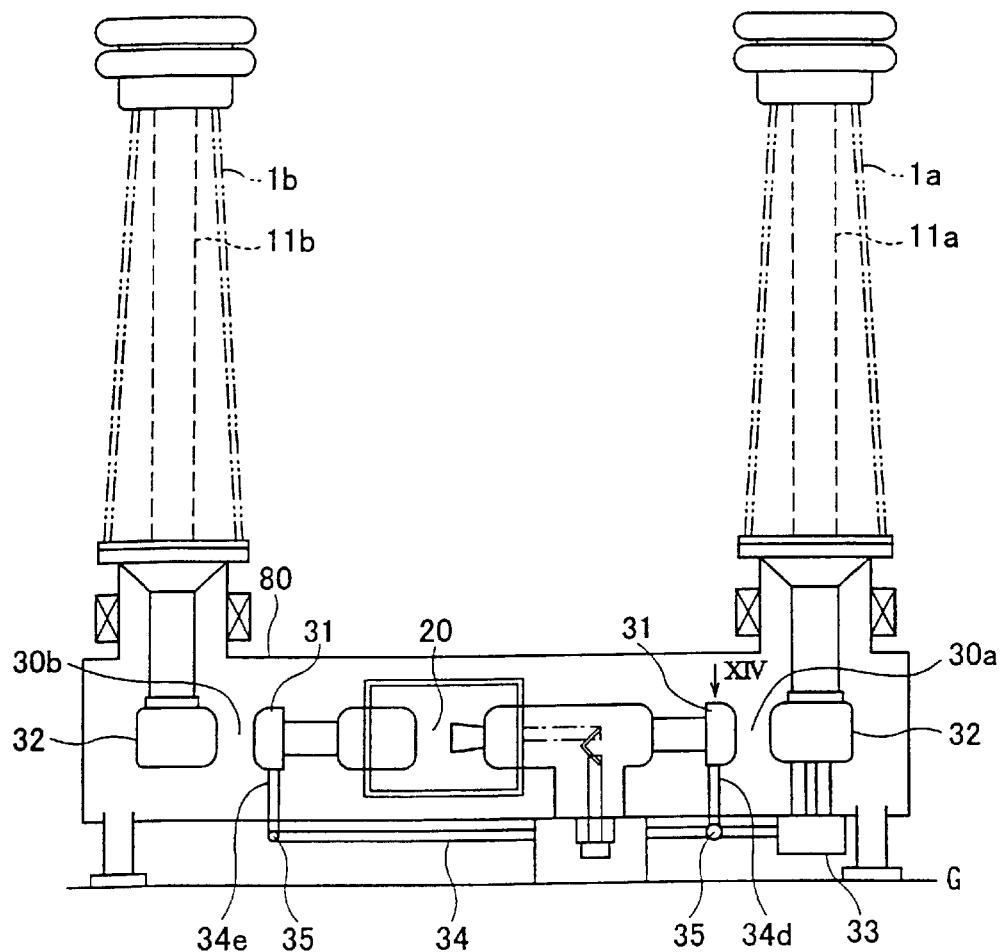
FIG. 13 is a schematic elevational section of the hybrid gas insulation switchgear apparatus in a twelfth embodiment of the present invention.
Figure 14A:
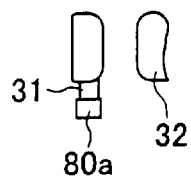
FIG. 14 are illustrations including FIG. 14A showing a grounding state, FIG. 14B showing a state of closed disconnector.
FIG. 14C showing a state of opened disconnector.
Figure 14B:
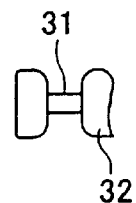
Figure 14C:
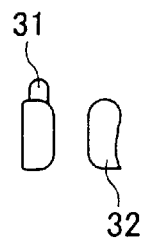

A twelfth embodiment of the present invention will be described hereunder with reference to FIG. 13 and FIG. 14. FIG. 14 is a view from an arrow of XIVA in FIG. 13 and includes FIGS. 14A, 14B and 14C showing a grounding state, a closed electrode condition of the disconnector, and an open electrode condition of the disconnector, respectively. This embodiment has a structure basically similar to that of the first embodiment. However, in this embodiment, two disconnectors 30a, 30b have the functions of the earth switches, and all of them are provided as can be driven by the single operating mechanism 33. More concretely, as shown in FIG. 13, the single operating mechanism 33 is provided on the lower surface of the enclosure 80, and there are provided transmitting sections 34d, 34e for transmitting the driving force to the movable side electrodes 31 of the disconnectors 30a, 30b through the operating rod 34 and the driving force branching devices 35, so that the disconnectors 30a, 30b can be driven by the operating mechanism 33.

The movable side electrodes 31 of the disconnectors 30a, 30b are constituted, as shown in FIG. 14A, to be in contact with the earth electrode 80a provided on the enclosure 80 under the grounding state, as shown in FIG. 14B, to be in contact with the stationary side electrode 32 of the disconnectors 30a, 30b, and further, as shown in FIG. 14C, under the open electrode state of the disconnector, to be separated from the earth electrode 80a and the stationary side electrode 32.

12-2. Function and Effect

According to this embodiment, substantially the same function and effect as those of the first and eighth embodiments are obtainable, and three of the four operating mechanisms 33 conventionally required can be omitted. Therefore, a greater simplification of the structure can be realized.

13. Other Embodiments

Figure 15:
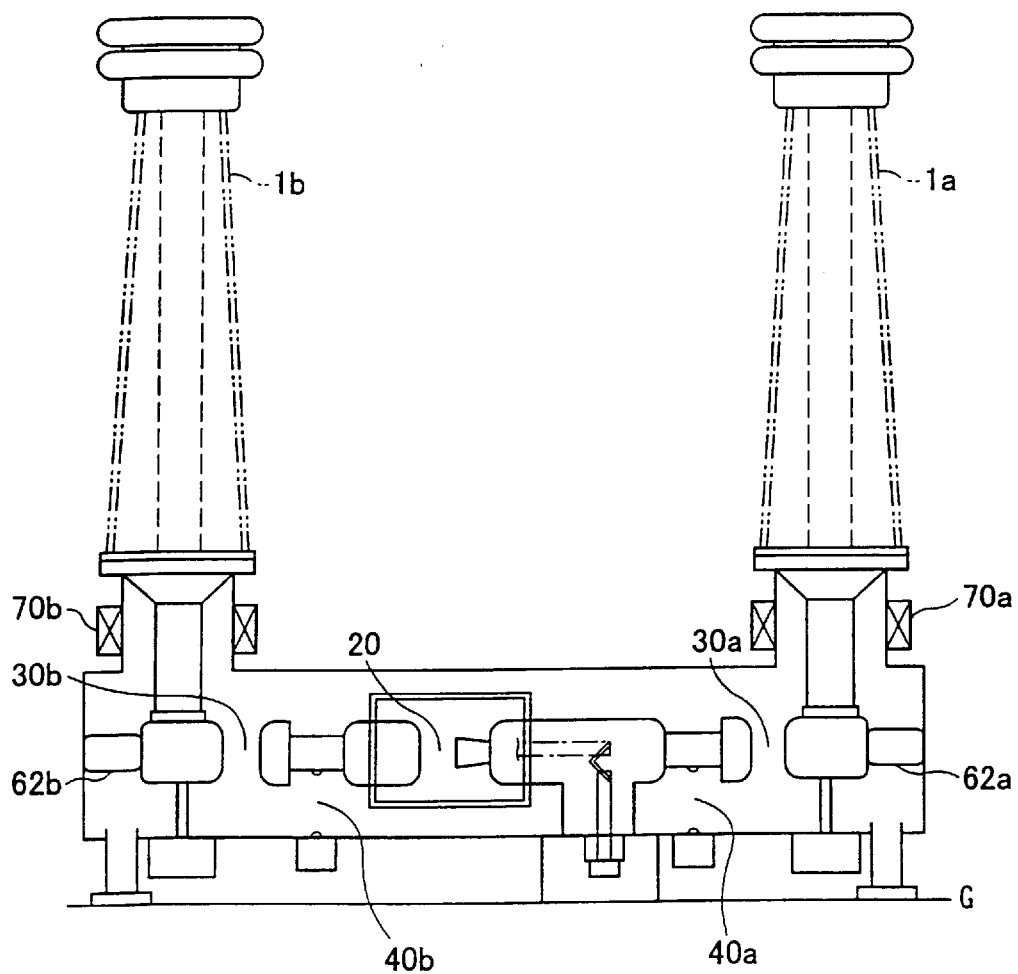
FIG. 15 is a schematic elevational view of the hybrid gas insulation switchgear apparatus according to a thirteenth embodiment of the present invention.

The present invention is not limited to the embodiments as mentioned above. Namely, there is provided an embodiment corresponding to the invention of the ninth embodiment, and in this embodiment, as shown in FIG. 15, the supporting and fixing of the conductors 11a, 11b of the bushings 1a, 1b and the movable side electrode 31 of the disconnectors 30a, 30b of the first embodiment are made by approximately columnar insulators 62a, 62b provided on the enclosure 80 instead of the cylindrical insulator of the first embodiment. According to such embodiment, the constitutional members or parts can be made small and the entire structure of the switchgear apparatus can be made simplified.

Figure 16:
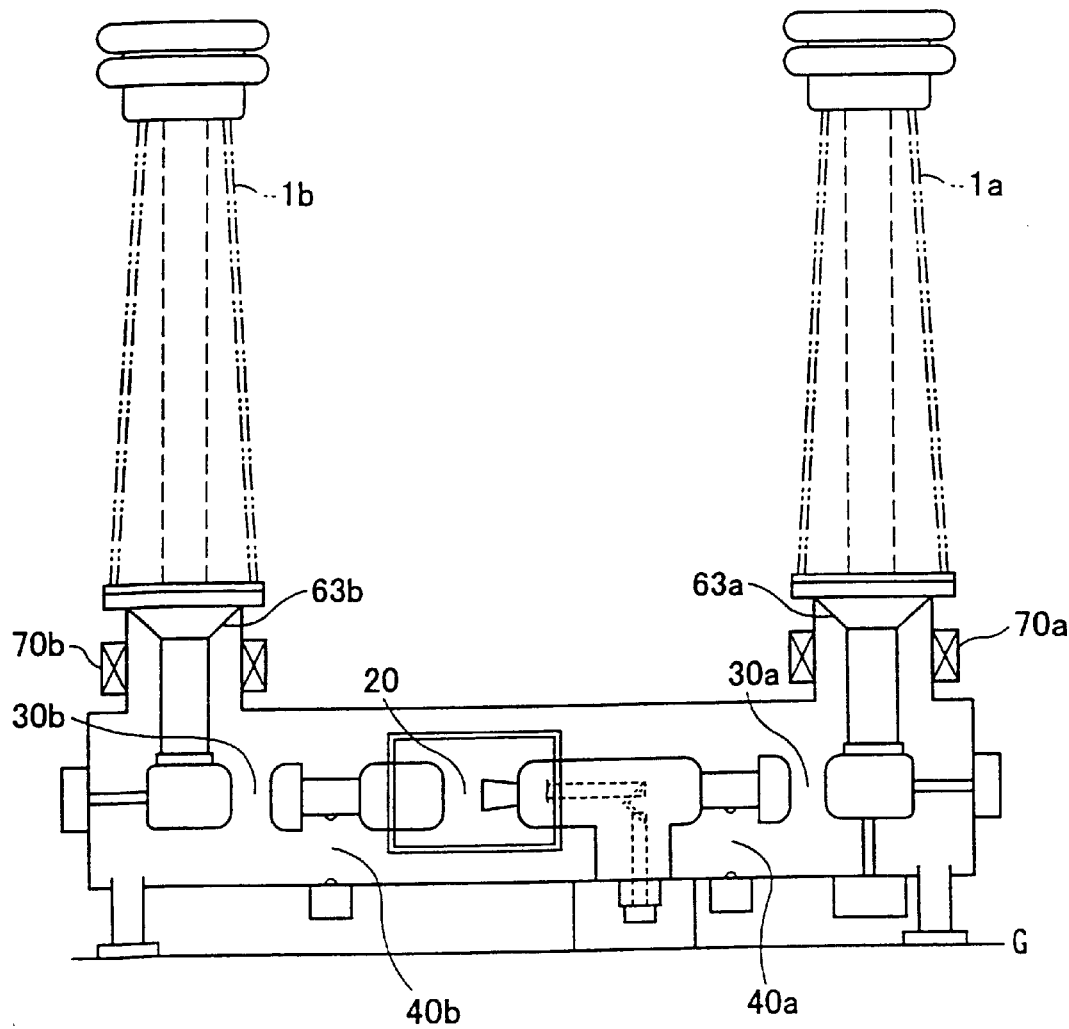
FIG. 16 is a schematic elevational section of the hybrid gas insulation switchgear apparatus according to fourteenth embodiment of the present invention.

Furthermore, in another embodiment shown in FIG. 16, a gas space between the bushings 1a, 1b and the enclosure 80 in the first embodiment is sectioned, and approximately conical insulators 63a, 63b for connection and supporting the conductors 11a, 11b with the movable side electrode 31 of the disconnectors 30a, 30b are disposed in the branched portion of the enclosure 80. According to this embodiment, workability at the time of checking or inspecting the switchgear apparatus can be improved.

Figure 17B:
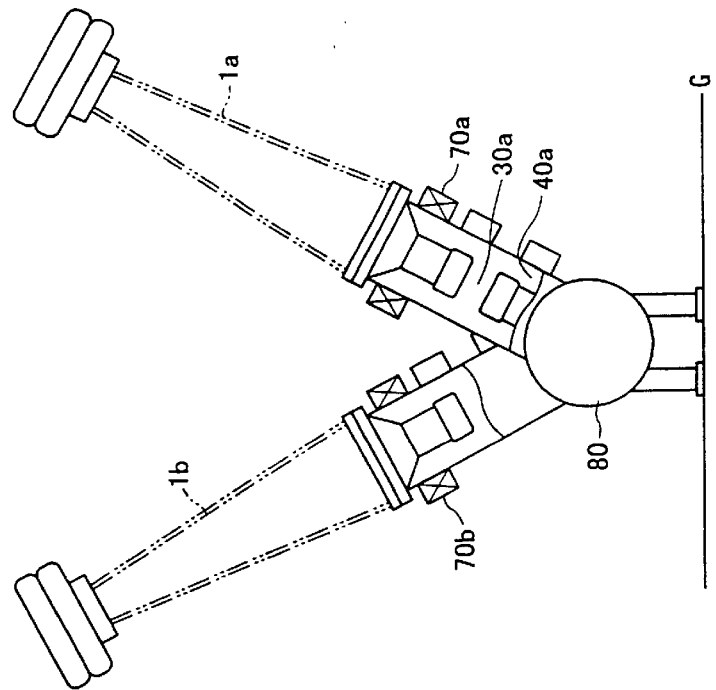
FIG. 17 includes FIG. 17A showing a schematic side view and FIG. 17B showing a schematic front view of the hybrid gas insulation switchgear apparatus according to a fifteenth embodiment of the present invention.
Figure 17A:
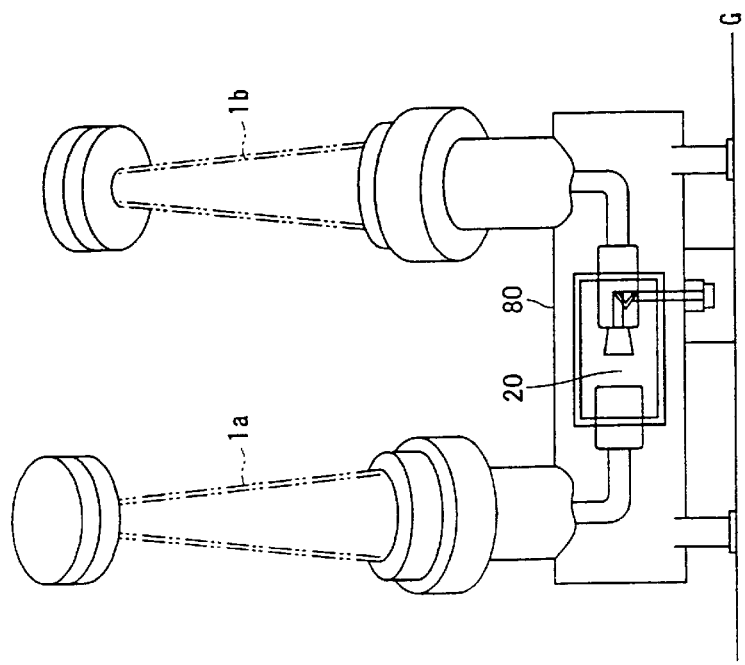

Furthermore, in an embodiment shown in FIGS. 17A and 17B, the branch portion of the enclosure 80 in the seventh embodiment may be provided approximately vertically to the axis of the enclosure 80, by which the constitution of the enclosure 80 can be simplified to thereby manufacture the switchgear apparatus at low cost.

Figure 18:
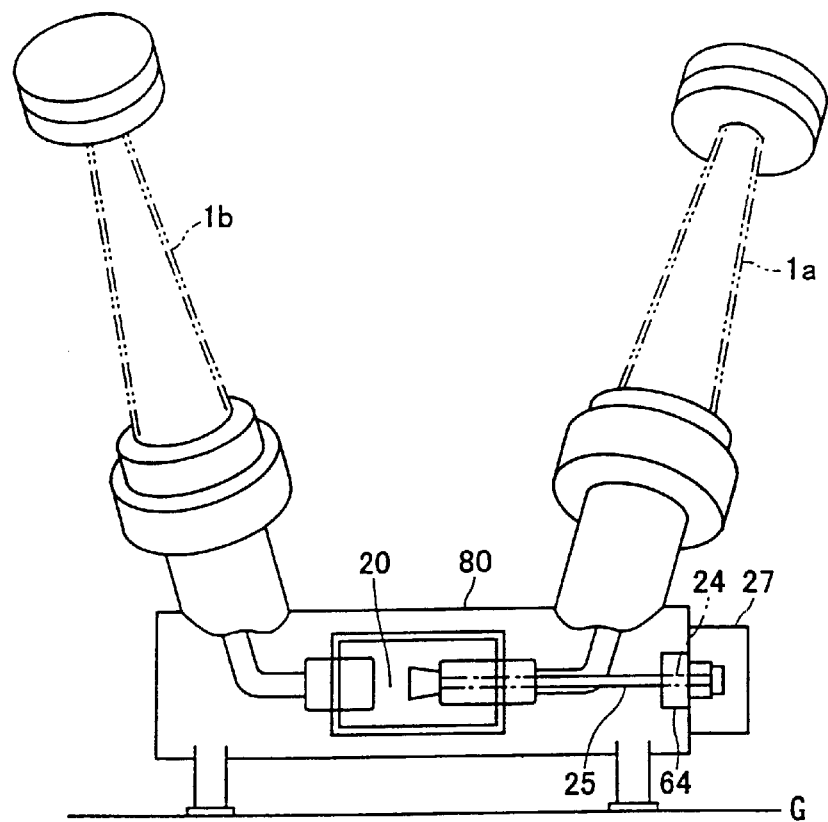
FIG. 18 is a schematic elevational section of the hybrid gas insulation switchgear apparatus according to a sixteenth embodiment of the present invention.

Still furthermore, in an embodiment corresponding to the invention of the third embodiment, as shown in FIG. 18 and FIGS. 19A and 19B, the third embodiment may be applied to the fourth and fifth embodiments. That is, in this case, the operating mechanism 27 for driving the movable side electrode 22 in the breaker 20 is disposed (displaced) on one side in the longitudinal direction of the enclosure 80 and the operating rod 24 is arranged on a horizontal straight line. Further, a cylindrical insulator 64 for supporting the breaker 20, the earth switch 40a, and the stationary side electrode 32 of the disconnector 30*a* is provided inside the enclosure 80. According to such arrangement, the operating rod 24 for driving the breaker 20 can be arranged on a straight line, which makes simple the constitution of the driving unit.

As described hereinbefore, according to the present invention, it is possible to provide a compact, simple and low priced hybrid gas insulation switchgear apparatus.

It is to be noted that the present invention is not limited to the described embodiments and many other changes and modifications may be made without departing from the scopes of the appended claims.

What is claimed is:

1. A hybrid gas insulation switchgear apparatus comprising:
   an enclosure in which an insulating gas is sealed;
   a bushing unit provided for the enclosure;
   a breaker unit disposed inside the enclosure;
   a disconnector unit disposed inside the enclosure and including disconnectors to be connected electrically in series to both sides of the breaker unit;
   an earth switch unit disposed inside the enclosure and including earth switches disposed between the breaker unit and the disconnectors, respectively, and said earth switches being provided with main pole side electrodes disposed on the side of the breaker unit; and
   a current transformer mounted to the enclosure, wherein:
   said bushing unit including bushings each having a conductor connected to an electrode of the disconnector on a side opposite to the breaker,
   said enclosure and said bushing unit defines a space therebetween which sectioned by an insulating member having substantially conical shape, and said electrode disposed on the side opposite to the breaker unit in the disconnector is supported by the insulating member,
   said enclosure is provided with at least one branch portion, the bushing unit being mounted to the branch portion and at least a set of disconnector and earth switch is accommodated in the branch portion, and
   two branch portions are provided in different height level with an inclination with respect to an axis of the enclosure.

2. The hybrid gas insulation switchgear apparatus according to claim 1, wherein said two branch portions are provided with an inclination symmetrically with respect to the axis of said enclosure at mutually different angles.

3. The hybrid gas insulation switchgear apparatus according to claim 1, wherein said two branch portions are provided with an inclination in a perpendicular direction to the axis of the enclosure.

4. The hybrid gas insulation switchgear apparatus according to claim 1, wherein said breaker unit is driven by an operating mechanism provided on an extension of an axis of the electrode for the breaker unit.

5. The hybrid gas insulation switchgear apparatus according to claim 1, wherein said disconnectors are driven by a single operating mechanism.

6. The hybrid gas insulation switchgear apparatus according to claim 5, wherein said enclosure is disposed in horizontal direction with respect to the ground level, two branch portions accommodating the disconnectors are provided on an upper portion of the enclosure, an operating mechanism is set at substantially a central portion of the branch portions on the upper portion of the enclosure, and said two disconnectors disposed inside the branch portions and the operating mechanism are connected through an operating rod.

* * * * *